Feb. 23, 1932.　　　G. J. ALBERTONI　　　1,846,241
METHOD OF AND APPARATUS FOR TESTING RUBBER
Filed April 5, 1924　　2 Sheets-Sheet 1
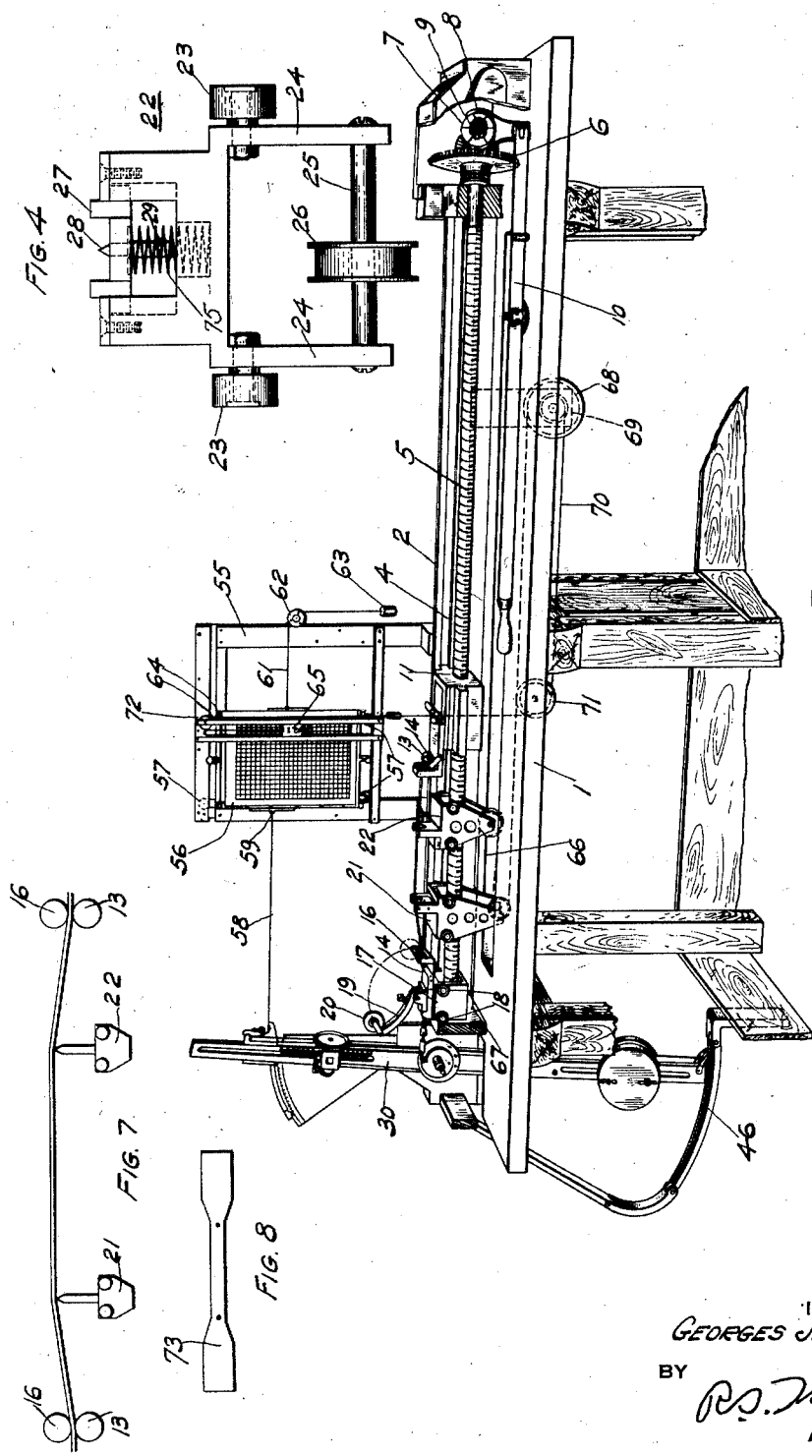
INVENTOR
GEORGES J. ALBERTONI
BY
ATTORNEY

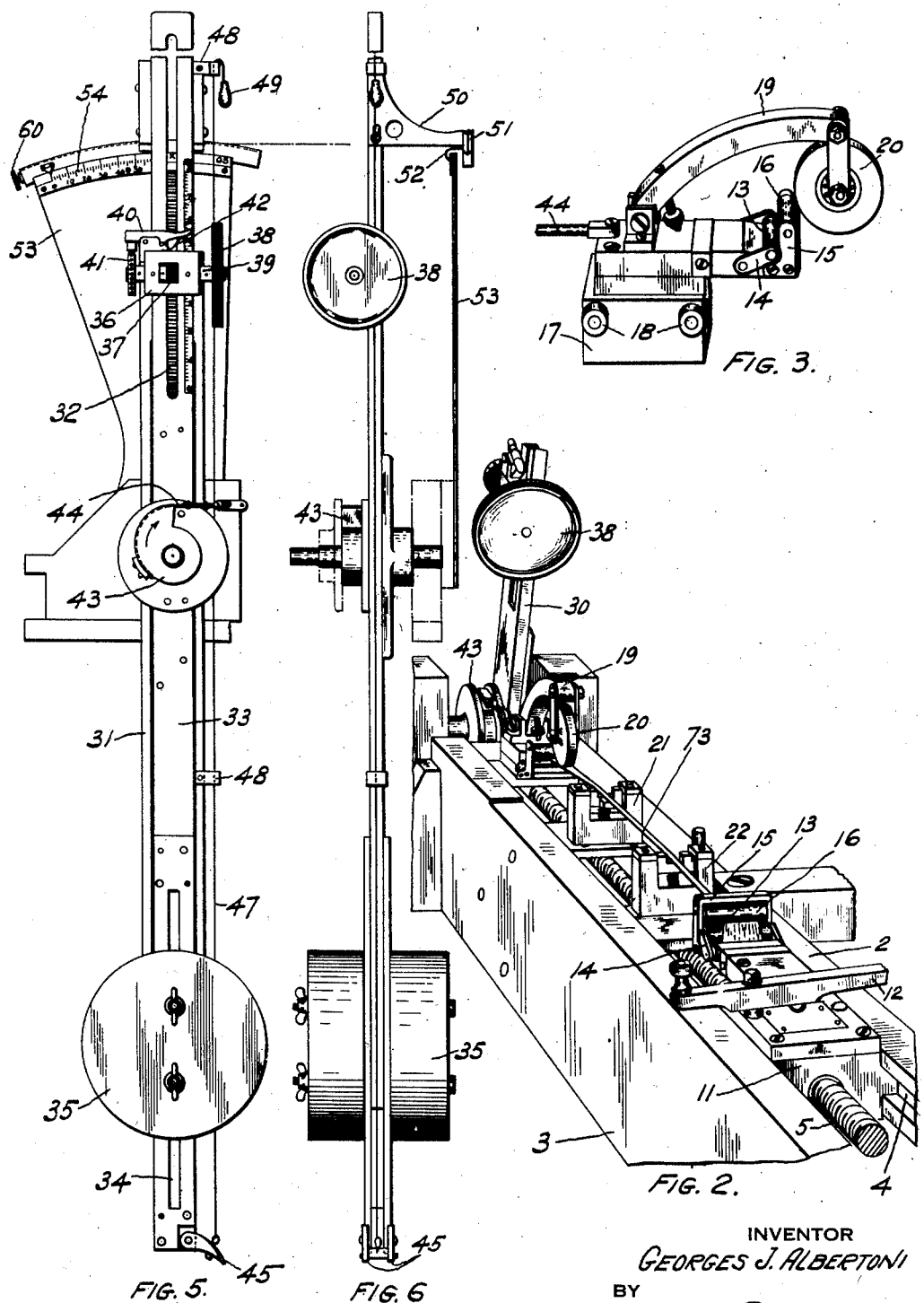

Patented Feb. 23, 1932

1,846,241

UNITED STATES PATENT OFFICE

GEORGE J. ALBERTONI, OF AKRON, OHIO, ASSIGNOR TO THE GOODYEAR TIRE & RUBBER COMPANY, OF AKRON, OHIO, A CORPORATION OF OHIO

METHOD OF AND APPARATUS FOR TESTING RUBBER

Application filed April 5, 1924. Serial No. 704,373.

My invention relates to a machine for testing rubber, and it has, for its primary object, the provision of a device, of the above designated character, which shall facilitate the determination of the characteristics of rubber by recording its percentage of elongation with respect to loads applied thereto.

Machines have been devised heretofore for determining the percentage of elongation of rubber with the application of a load, but such machines are open to criticism because special record forms must be employed to register the characteristics of the material under test. The present machine is particularly designed with the object in view of immediately obtaining an exact record of the elongation with the application of load. Moreover, my machine embodies a recording device so operated as to provide a curve upon ordinary co-ordinate paper, which gives the desired results in a form that may be preserved for reference.

The machine of my invention is further adapted to provide a record of the hysteresis of rubber by registering the degree of elongation with an application of a load, and the manner in which the test piece relaxes when the load is decreased.

Another advantage of my invention resides in the fact that a large number of tests may be made upon various pieces of rubber, and a record thereof made upon a single sheet of coordinate paper.

Another feature of the device of my invention is found in the uniformity of tests made upon different pieces of the same sample of rubber. In other words, similar conditions are so established that variations in the gauge of the rubber will not affect accurate comparisons thereof with regard to their physical characteristics.

A still further object of my invention resides in obtaining a record of the distortion of rubber under load by measuring the distortion in a selected portion thereof, which is of uniform section, whereby a more accurate result is obtained.

With these and other objects in view, my invention will be more fully described, illustrated in the accompanying drawings and then fully set forth in the appended claims.

In the accompanying drawings, Fig. 1 is a perspective view, parts being broken away, of a machine embodying the principles of my invention.

Fig. 2 is a perspective view, on a larger scale, of a portion of the machine shown in Fig. 1.

Fig. 3 is another perspective view of a portion of the apparatus shown in the preceding figures.

Fig. 4 is an end elevational view of a member that is utilized in effecting the recording of the elongation of a test piece of material.

Fig. 5 is a side elevational view of a lever, and certain attachments therefor, that is employed as a loading device on the machine.

Fig. 6 is an end view of the lever shown in Fig. 5.

Fig. 7 is a diagrammatic view of a test piece of material and certain important elements that enter into its testing, and Fig. 8 is a plan view of a standard test piece of material.

In practicing my invention, a machine for testing rubber may be provided by employing a plurality of movable carriages suitably mounted and having a plurality of freely mounted members interposed between them. A rubber test piece is connected to the carriages, one of which is in turn connected to a weighted lever that serves as a load. The freely movable members have pins or pointers adapted to engage a selected portion of the test piece, whereby they are separated in response to elongation of the test piece when one of the carriages is positively moved away from the other. Means is employed to interconnect the freely movable members, and a recording device, whereby the degree of elongation of the test piece is recorded in conjunction with the amount of load applied. The freely movable members are so utilized that a selected portion, or a uniform portion, of the rubber may be tested. A cam member is mounted upon the lever to serve as a connecting means, together with a strap, to one of the carriages, whereby the moment arm of the lever is continuously changed. A device is also mounted upon the lever, whereby its moment arm may be varied to provide for a variation in load when test pieces of different gauge are employed. A recording device is operated by the cooperating elements of the machine that provides a curve indicating the degree of distortion of material under test with the load imposed upon it.

A better understanding of my invention may be had by reference to the accompanying drawings, in Fig. 1 of which is shown a machine comprising any suitable supporting device, such as a table 1, upon which is mounted a plurality of guide members 2 and 3, each having a channel 4 therein. A longitudinally extending threaded shaft 5 is mounted between the guide members and is adapted to be driven through the agency of a beveled gear 6 mounted upon one end thereof, that is adapted to engage gears 7 mounted adjacent thereto. The gears 7 are slidably mounted upon a shaft 8 by means of a key 9, and are connected to a lever 10 whereby they may be moved into and out of engagement with the gear 6. Any suitable means may be employed for driving the shaft 8, such as a motor belted or geared thereto, which has not been shown.

A carriage 11 is mounted upon the shaft 5, having an interiorly threaded portion, and such threaded portion is adapted to be engaged with the shaft by means of a pivoted lever 12 mounted upon the carriage. The particular construction of this portion of the carriage is no part of my invention, and it is sufficient to state that it is so arranged that it may be disengaged from the shaft 5 so as not to be moved therealong when the shaft is rotated. The carriage 11 is, of course, provided with flanges adapted to fit into the channels 4 of the guides. The carriage is provided with a clamping device comprising a roller 13 pivotally mounted upon arms 14, which are also pivotally connected to the carriage 11. An upstanding yoke 15 is mounted upon the carriage and carries a second roller 16 which cooperates with the roller 13 to secure material to the carriage. A second carriage 17 is mounted upon the guides 2 and 3 by means of rollers 18 rotatably secured to the sides thereof. These rollers fit into the channels 4 of the guides to provide a support for the carriage 17, whereby it may be moved freely along the guides. An arm 19, having a roller 20 mounted upon the end thereof, is pivotally mounted upon the top of the carriage 17, and is adapted to engage a piece of rubber secured thereto. The carriage also has a clamping mechanism similar to that described upon the carriage 11, the various portions thereof being correspondingly numbered.

A plurality of members 21 and 22 are freely mounted upon the guides, intermediate the carriages 11 and 17. These members 21 and 22 are similar in construction, with the exception that one is somewhat longer than its cooperating member. Each of these members has rollers 23 mounted upon the sides thereof, that are adapted to ride in the channels 4 of the guides. They also have depending arms 24 which carry a shaft 25 upon which a pulley 26 is freely mounted. A U-shaped member 27 is mounted in a recess in the top of each member. A centrally located pin or pointer 28, having a shank 29 disposed within a spring 75, supports the member as a whole. The two members 21 and 22 differ in construction, in that the depending arms 24 of the member 21 are somewhat longer than those of the member 22, in order to stagger the pulleys 26 with respect to each other.

A lever 30 is pivotally mounted upon one end of the table 1 adjacent to the guides 2 and 3. The lever is constructed of a portion 31, which is provided with a rack 32, and an intermediate portion 33, having an elongate slot 34 whereby a weight 35 is adjustably secured to the bottom of the member. A member 36 is mounted upon the member 33, and is provided with a small gear 37 adapted to mesh with the rack 32. The gear 37 is actuated by means of a knurled nut 38 mounted upon the end of a shaft 39, which carries the gear 37. A locking device to secure the member 36 in any adjusted position is provided by means of a pawl 40 pivotally mounted upon the member and maintained in engagement with a wheel 41, mounted on the shaft 39 and having peripheral recesses, by means of a spring 42. The pawl 40 is provided, of course, with a suitable pin to seat in the recesses of the wheel 41. A cam member 43 is secured to the lever at substantially its central portion, and is connected to the carriage 17 by means of a strap 44 trained over the cam and secured thereto.

In order to provide means for maintaining the lever in a position advanced from the vertical, it is provided with a plurality of pawls 45 pivotally mounted upon its lower end. The pawls are adapted to engage a rack 46 secured to the table 1, as illustrated. In order to provide for holding the pawls 45 out of engagement with the rack, a cord 47 is connected thereto, which is held in suitable supporting members 48 and provided with a counterbalancing weight 49 to maintain it taut.

A bracket 50 is secured to the lever, and supports an arcuate groved member 51 to which a pointer 52 is secured. A segmental plate 53 is suitably mounted adjacent to the pointer 52 and is provided with a scale 54. A recording device is mounted upon a frame 55, which is supported by the table 1. A plate 56 is mounted upon a plurality of roller members 57 which ride in channels provided therefor in the frame 55. A cord 58 is connected at one end, by means of a thumb screw 59, to the plate 56, and is trained over the grooved member 51, and connected thereto by means of a second thumb screw 60. Another cord 61, connected to the plate 56, is trained over a pulley 62 mounted upon the frame 55, and has its other end secured to a weight 63. A plurality of guides 64 are mounted upon the frame 55 to provide a support for a member 65, that carries a tracing implement of any suitable design. It is desirable that the implement may be moved into and out of engagement with the plate 56, or co-ordinate paper mounted thereon.

The members 21 and 22 are connected together and interconnected to the member 65 by means of a cord 66 which has one end secured to the table, as indicated at 67, and the other end is fastened to a pulley 68 mounted upon a shaft carrying a second pulley 69. The cord 66 is trained over the pulleys 26 of the members 21 and 22, and wrapped once or twice about the pulley 68. A second cord 70 is secured to the pulley 69, trained over a pulley 71 mounted upon the table 1, over a second pulley 72 mounted upon the frame 55 and connected to the member 65. The two pulleys 68 and 69 are utilized to provide a reduction gearing so as to secure proper movement of the member 65 with respect to the operating movement of the members 21 and 22.

The operation of the machine described will be apparent from the foregoing description. In order to test a piece of rubber, or other similar material, a strip 73 of the material has its ends secured to the carriages 11 and 17. It is mounted therein by lifting the roller 13 carried by the arms 14, wrapping one end of the rubber thereabout and then depressing the arms so that the under portion thereof engages the top of the carriage. The rubber disposed about the roller 13 also engages the roller 16 which holds the strip in close engagement with the pins 28 mounted in the members 21 and 22. The member 19 on the carriage 17 serves to aid in maintaining close engagement with the pins by lowering the roller 20 to engage the strip of rubber, as indicated in Fig. 2, the weight of the pivoted arm serving to depress the material. It will be observed that the usual test piece of rubber is cut wider at the ends than at its central portion, and, to secure an accurate record of the degree of distortion of the test piece, it is desirable to record the distortion of the central portion, or narrower portion thereof, which is of uniform section. The members 21 and 22 may be spaced, at a suitable distance from each other, with the pins 28 in engagement with the test piece 73.

It is customary to provide marks upon the test pieces, as clearly indicated at 74 in Figure 8 of the drawings, to aid in initially positioning the members 21 and 22 with respect to the piece and in maintaining the pins 28 in proper position throughout the test. Although the yielding engagement of the pins 28 with the test piece 73 is usually sufficient to cause proper movement of the carriages 21 and 22 throughout the test, it is possible that relative movement of the piece and one or the other of the pins 28 may occur. In this event the carriages may be manually moved to align the pins with the marks 74 on the test piece. This is possible because of the independently movable mounting of the carriages 21 and 22.

When the test piece has been secured to the carriages, and the members 21 and 22 properly positioned, as described, the shaft 5 is rotated by engaging the driving gear 7 with the gear 6. The lever 12 serves to engage the threaded portion of the carriage 11 with the shaft, and causes the carriage to be advanced along the shaft away from its cooperating carriage 17, whereby the test piece 73 is elongated. It will be appreciated that, as the carriages are separated, the lever 30 imposes a gradually increasing load upon the material. It should be noted that the moment arm is so changed by the cam member as the lever is swung from the vertical that the load is proportional to the distance traversed over an arcuate path. In other words, equiangular displacements of the lever from the vertical result in equal increments of load. The cam member is designed according to a result determined upon mathematically, the details of which are of no interest, as they may be provided by any one proficient in the art. As the test piece is elongated, by reason of the load imposed upon it, the members 21 and 22 are separated, and their relative movement causes movement of the cord 66, which rotates the pulley 68 and, consequently, the pulley 69. The cord 70 is likewise moved, and, thereby, the tracing implement, carried by the member 65, is moved upward along its supporting guides 64.

The plate 56 is so adjusted by means of the screw 59 or 60, that the tracing implement engages one corner of the coordinate paper with the lever vertically disposed. When the lever is moved, the weight 63 is permitted to draw the plate 56 along its support 55 whereby normal movement of the plate with respect to the tracing implement results. Consequently, as the test piece is elongated, the tracing implement moves over the co-ordinate paper disposed upon the plate 56, and traces a curve thereon which provides a record showing the relation between the load imposed and the resulting elongation in the test piece. The distance along the abscissa of the co-ordinate paper indicates load, whereas the ordinates indicate the degree of elongation of the test piece. It will be observed that the arcuate member 51, over which the cord 58 is trained, plays an important part in securing proper movement of the plate 56. By reason of the combination of the cam 43 with the member 51, a movement of the plate 56 is secured which is directly proportional to the load applied.

In order to obtain an accurate comparison between various pieces of rubber of different gauge, the adjusting device 36 is utilized. It is initially set at some position, for example, zero, on the scale carried by the pendulum, and if a test piece of different thickness is subsequently tested, the device is raised or lowered by releasing the pawl from engagement with the wheel 41, and turning the knurled nut 38 in a suitable direction to raise or lower the weighted portion of the lever. For example, the scale indicated on the lever is so divided that a test piece of rubber of two millimeters thickness will require a setting of the member 36 at zero.

If it is desired to secure a hysteresis curve of the test piece, the material is placed in the machine and the machine operated, as above described, until any desired point on the stress-strain curve is reached, such point, of course, being somewhat less than the breaking point of the material. The carriage 11 is then caused to return by reversing the direction of rotation of the shaft 5, thereby permitting the test piece to relax under a gradually decreasing load. This operation may be repeated a number of times to obtain comparative hysteresis curves showing the distortion of the material with the application of successive loads.

Although I have specifically described but one embodiment of my invention, it is obvious that the principles thereof may be utilized to advantage in other constructions without departing from the spirit or scope of the invention, and I desire, therefore, that no limitations shall be imposed except such as indicated in the appended claims.

What I claim is:

1. A testing machine comprising means for securing elastic material in the machine, a plurality of movable members adapted to engage a selected portion of the material, means for imposing a variable load upon the material, mechanism for varying the action of said means for applying a proportionately uniform load upon strips of material of different gauge, and means for recording relative movement of the movable members.

2. A testing machine comprising means for securing elastic material in the machine, a plurality of movable members provided with yieldably mounted means adapted to engage the material, means for imposing a variable load upon the material and means for recording the relative movement of the movable members with the change of load.

3. A testing machine comprising means for securing elastic material in the machine, a plurality of movable members provided with yieldably mounted pins adapted to engage the material, means for imposing a variable load upon the material, said means including a lever provided with means for maintaining it in a position advanced from vertical and means for recording the relative movement of the movable members with the change of load.

4. A testing machine comprising a plurality of movable carriages, means for securing the ends of a strip of material therein, a plurality of freely movable members provided with yieldably mounted pins adapted to engage the strip, a lever having means for maintaining it in an advanced position from vertical, means for connecting the lever to one of the carriages and means for recording relative movement of the movable members with a change in the position of the lever.

5. A testing machine comprising a plurality of movable carriages, means for securing the ends of a strip of material therein, a plurality of freely movable members provided with yieldably mounted projections adapted to engage the strip, a lever having means for maintaining it in an advanced position from vertical, means for connecting the lever to one of the carriages and means for recording distortion of the strip of material with a change in the position of the lever, said means including means interconnecting the freely movable members together and to a movable tracing implement.

6. A testing machine comprising longitudinally disposed guides, a plurality of carriages movably mounted thereon, means for securing a strip of test material to the carriages, means for separating the carriages, a plurality of members freely mounted on the guides and provided with resiliently mounted projections adapted to engage the strip, a lever connected to one of the carriages, a recording device and means interconnecting the members and the recording device.

7. A testing machine comprising longitudinally disposed guides, a plurality of carriages movably mounted thereon, means for securing a strip of test material to the carriages, means for separating the carriages, a plurality of members freely mounted on the guides and provided with resiliently mounted pins adapted to engage the strip, a lever supported adjacent the guides, a cam member secured to the lever, means connecting the cam member to one of the carriages, a recording device, and means interconnecting the members on the guides and the device.

8. A testing machine comprising longitudinally disposed guides, a plurality of carriages mounted thereon, having guide rolls and clamping members adapted to secure a test strip to the carriages, means for moving one of the carriages along the guides, a plurality of members freely mounted upon the guides provided with resiliently mounted pins adapted to engage the strip, means tending to maintain the strip in firm engagement with the pins, a lever supported adjacent the guides, a cam member secured to the lever, a flexible strap trained over the cam and connected to one of the carriages, a recording device and means interconnecting the members mounted on the guides and the recording device.

9. A rubber testing machine comprising means for securing rubber in the machine, a pivotally mounted member, means for connecting the member to the rubber as a load therefor and means for imparting movement to a recording element in stages directly proportionate to the load imposed by the member.

10. A rubber testing machine comprising means for securing rubber in the machine, a pivotally mounted member, an arcuate member secured to the first member, a cam mounted upon the first member, means connecting the cam to the rubber to apply the pivoted member as a load thereto and flexible means supported by the arcuate member and connecting such member to a recording element.

11. In a testing machine, a clamping mechanism comprising a swingably mounted rotatable member and a cooperating rotatable member mounted upon a stationary support.

12. In a testing machine, the combination with a loading device, and a recording mechanism, of a clamping device comprising a swingably mounted rotatable member and a cooperating rotatable member mounted upon a stationary support.

13. In a testing machine, the combination with a recording mechanism and a loading device, of a plurality of carriages each provided with a clamping mechanism comprising a swingably mounted member and a cooperating member mounted in fixed relation thereto.

14. A method of testing rubber which comprises applying a load to effect elongation of a strip of rubber, permitting the rubber to relax with a decreasing load and recording the degree of distortion of a selected portion of the rubber with the varying load.

15. In a testing machine, having means for recording the strain and means for subjecting the test sample to a variable load, means for recording elongation that comprises a plurality of members resiliently engaged with a selected portion of the test piece and in cooperative relation with the recording means.

16. In a testing machine the combination with a load applying device, having means for recording the strain and means for subjecting the test sample to a variable load, of means for recording elongation that comprises a plurality of members frictionally engaging a selected portion of the test sample adapted to communicate their relative movement to the recording means.

17. In a testing machine the combination with a load applying device, having means for recording the strain and means for subjecting the test sample to a variable load, of means for recording elongation that comprises a plurality of members frictionally supporting a selected portion of the test sample and adapted for relative movement by frictional contact therewith.

18. A rubber testing machine comprising means for securing rubber in the machine, a pivotally mounted member, means for connecting the member to the rubber as a load therefor, a recording chart, and means for imparting movement to the recording chart in stages directly proportionate to the load applied by the pivotally mounted member.

19. A testing machine comprising a support, relatively movable carriages disposed on the support adapted to receive a test specimen, a load applying member pivotally mounted adjacent one of the carriages, means connecting the load applying member and the carriage adjacent thereto, a counter-weight adjustably positioned on the member, an index scale positioned on the member, and means to vary the index scale with changes in the location of the counter-weight, whereby the load may be proportioned according to the cross-sectional area of the test specimen.

20. A testing machine comprising a support, relatively movable carriages disposed on the support adapted to receive a test specimen, a load applying pendulum pivotally mounted adjacent one of the carriages, means connecting the load applying member and the carriage adjacent thereto, a counter-weight adjustably positioned adjacent one of the carriages, an index scale on the member, and a rack and pinion mechanism for the index scale operatively connected to the counter-weight, whereby variations in the moment of the pivotally mounted member may be determined by observation.

21. A testing machine, means for recording the stress-strain relationship of samples of material having a particular length and area of cross section, and movable weight means on a graduated lever arm for compensating the first means for variations in cross sectional area of the samples.

22. A testing machine comprising relatively movable jaw members between which the material to be tested is held, mechanism for moving said holding means and applying a stress to the material held thereby, a recorder, means for actuating the recorder in response to stress on said material, independently movable means for measuring the strain in said material, means connecting said strain measuring means and the recorder, and adjustable means in said stress-responsive recorder-actuating means for compensating for variations in gauge of the material so as to obtain comparable stress-strain graphs irrespective of the gauge of the material.

23. A testing machine comprising relatively movable pairs of clamping jaw members in which the material to be tested is adapted to be held, means for separating said pairs of jaw members to elongate the material, means for indicating the stress on the material, a recorder, means connecting the recorder with the indicating means, means for measuring the elongation of a predetermined and particular portion of said material between said pairs of jaw members, means connecting said recorder with said last mentioned means, and means for adjusting the stress indicating means to obtain uniform readings of the recorder with samples of the same material having different areas of cross section.

24. A testing machine, comprising pairs of jaw members to hold the material under test, a graduated weighted lever to which one pair of jaw members is connected, a stress-strain recorder, actuating mechanism therefor and means for adjusting the weight to graduations on said lever to compensate for variations in gauge of the material.

25. In a testing machine provided with movable pairs of clamping jaws in which the material to be tested is held, actuating mechanism therefor, a recording device comprising a chart and marker, a lever arm for measuring the applied stress fastened to one of said jaw members, a weight on the lever arm, graph position adjusting means comprising gauge graduations on the lever arm for locating said weight and connection from said lever arm to said recording device.

In witness whereof, I have hereunto signed my name.

GEORGE J. ALBERTONI.